United States Patent Office 2,802,638
Patented Aug. 13, 1957

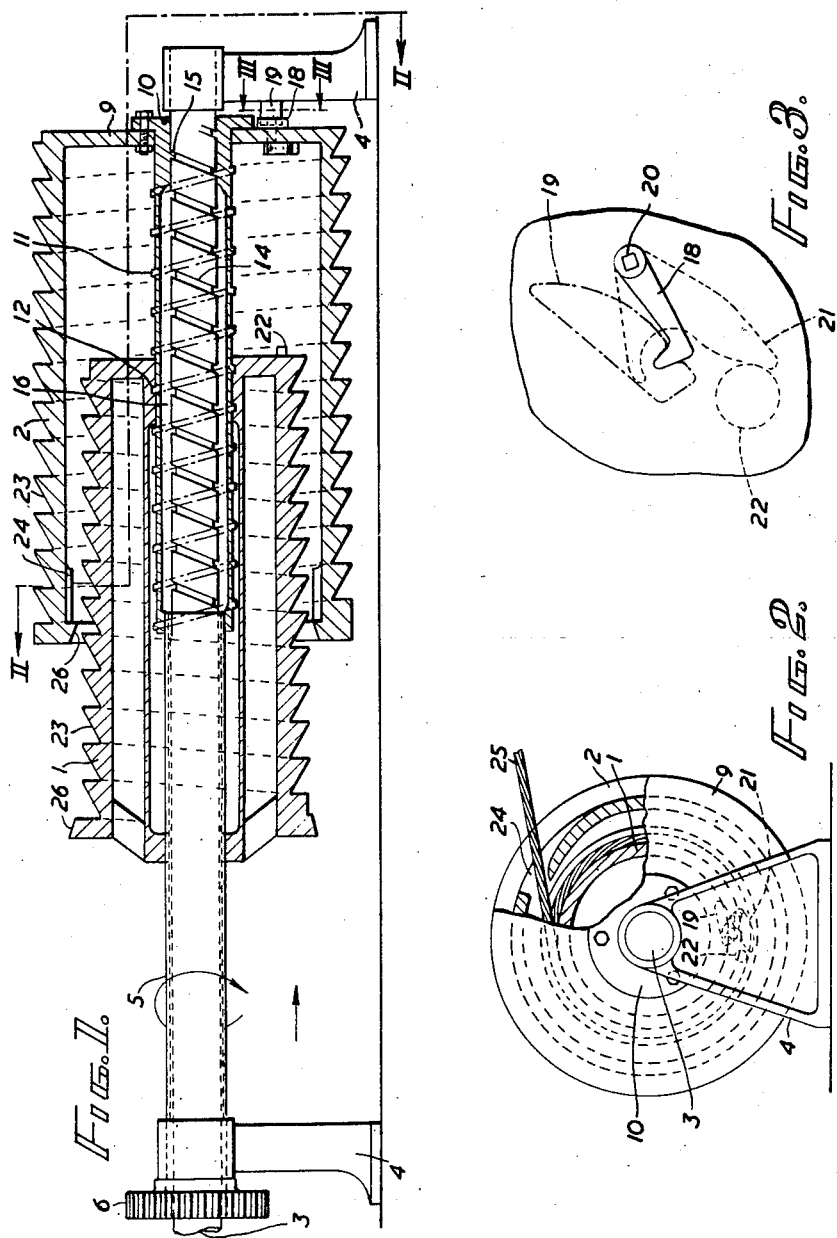

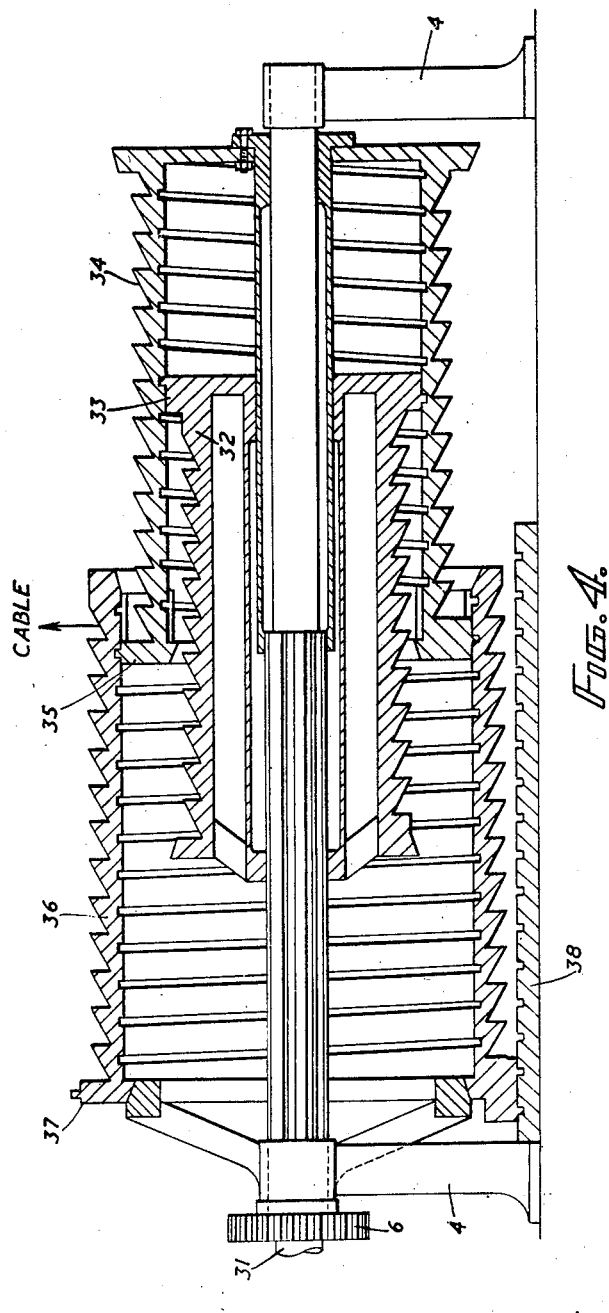

2,802,638

WINCH

Lionel Hugh Ireland, East Cowes, Isle of Wight, assignor to Saunders-Roe Limited, East Cowes, Isle of Wight, England, a company of Great Britain Application September 28, 1954, Serial No. 458,935

Claims priority, application Great Britain September 29, 1953

12 Claims. (Cl. 254—184)

This invention relates to winches of the kind in which the winding drum has in its surface a helical groove to receive the cable or the like as it is wound on to the drum. One application of the invention, to which it is not in any way limited, is to power-driven winches for winding cable of aerodynamic or hydrodynamic section used to suspend and/or tow apparatus from flying boats. Another application is to combined load and signal bearing cables, such as a hawser or tow-rope carrying an electric cable.

Such a winch, carrying only a single layer of cable, tends to be unduly bulky if a considerable length of cable, say one or two hundred feet, has to be wound. An object of the invention is to provide a more compact arrangement.

According to the present invention a winch includes inner and outer drums mounted coaxially, and having on their outer surfaces helical grooves of opposite hands, the outer drum having in it near one end a slot or opening through which the cable can pass to be wound on the inner drum, and means for rotating the inner drum to wind cable on to it while feeding it axially from an extended position extending out of the outer drum at the end of the latter where the opening is situated, to a nested position in which it lies within the outer drum, and thereafter, when the inner drum has reached the nested position and is completely wound with cable, rotating both drums together and feeding them in the opposite direction to wind further cable on the outer drum.

The axial feeding of the outer drum may be effected by co-operating screwthreads carried respectively by the drum and by a fixed part, while that of the inner drum may be effected by co-operating screwthreads carried respectively by the two drums. Conveniently the drive is transmitted to the inner drum, and when the latter reaches the fully nested position, is transmitted from the inner drum to the outer drum. The engagement of the inner drum with the outer drum when the former reaches the nested position may also serve to release a lock which held the outer drum stationary.

In one form of the invention co-operating bearing surfaces formed on the inner and outer drums at the end near the opening are arranged to engage when the drums reach the nested position so that the inner drum supports that end of the outer drum before the cable begins to be wound on the outer drum.

The arrangement has been referred to as comprising two drums but if desired it may comprise three or more drums similarly arranged to nest one within the other, resulting in a further saving of space.

The invention may be carried into practice in various ways but one or two specific embodiments will be described by way of example as applied to a power-driven winch intended for use in a flying boat for winding in a cable of special cross section chosen for aerodynamic or hydrodynamic reasons.

One embodiment is illustrated in the accompanying drawing, of which:

Figure 1 is a sectional elevation,

Figure 2 is an end elevation partly in section on the line II—II in Figure 1,

Figure 3 is an enlarged detail of a locking mechanism taken on the line III—III in Figure 1, and Figure 4 is a sectional elevation of an embodiment employing three drums.

The winch comprises an inner drum 1 and an outer drum 2 mounted on a common shaft 3 fixed at its ends in pedestals 4. About half the length of this fixed shaft is surrounded by a hollow driving shaft 5 having at its outer end, which may be termed the driving end, a gear 6 connected to driving means (not shown). The corresponding end of the inner drum 1 is formed with splines to co-operate with splines extending along the whole length of the driving shaft 5.

At the non-driving end the outer drum 2 has an inwardly-directed flange 9 bolted to a sleeve 10 which extends towards the driving end between the inner drum 1 and the fixed shaft 3. The outer surface of this sleeve 10 is formed with a screw thread 11 engaging a co-operating screwthread 12 formed in the inner surface of the inner drum 1, so that if the outer drum 2 remains stationary and the inner drum 1 is rotated by the driving means, the inner drum will be fed along axially.

The part of the fixed shaft 3 not surrounded by the driving shaft 5 is formed with a screwthread 14 of the same pitch but of opposite hand to that already referred to. The inner surface of the sleeve 10, at the non-driving end, is formed with a corresponding screwthread 15 while the remainder of its length is bored out sufficiently as at 16 to fit freely over the driving shaft 5, except at the driving end where it is a slide fit outside the splines on the shaft 5. Hence if the outer drum 2 is driven it will be fed along axially, but in the opposite direction to that in which the inner drum 1 is fed when the outer drum is fixed.

On its non-driving side the flange 9 of the outer drum carries a pivoted locking arm 18 urged by a spring (not shown) to engage in a notch in a fixed abutment 19 on the pedestal 4 to prevent the outer drum 2 from rotating with the inner drum 1, as shown in Figure 3. The pivot 20 of the locking arm 18 passes through the flange 9 and its inner end carries a cam fork 21, arranged to be engaged and operated by a boss 22 on the end of the inner drum 1 when the latter reaches its nested position in which it is completely within the outer drum 2. When this occurs the boss 22 and cam fork 21 form a driving connection from the inner drum to the outer drum so that the former drives the latter, and at the same time the cam fork 21, as it receives the boss 22 within it, is turned about its pivot and turns the locking arm 18 clear of the abutment 19 so as to release the outer drum and permit it to rotate.

The outer surfaces of both drums are formed with helical grooves 23 of special V section having unequally inclined sides to receive the cable. The grooves on the outer drum 2 correspond to and are of the same pitch as the screw-thread 14 by which the outer drum is fed axially, while the grooves on the inner drum 1 are of opposite hand and correspond to the screw thread 11 by which the inner drum is moved, so that as the cable is wound on each drum the point of winding will remain stationary in the axial direction. At the driving end the outer drum 2 has a slot 24 through which the cable 25 can enter to be wound on the inner drum. At this end the inner surface of the outer drum and the outer surface of the inner drum are formed with co-operating frusto-conical bearing surfaces 26 which engage when the inner drum is nested in the outer drum so that this end of the outer drum will be supported by the inner drum before any cable begins to be wound on the outer drum.

In operation winding begins with the inner drum 1 at the driving end and the outer drum 2 at the non-driving end, and the cable 25 passing through the opening 14 in the outer drum on to the non-driving end of the inner drum which is about level with the middle of the fixed shaft 3. As the splined driving shaft 5 rotates it turns the inner drum which is fed along as the cable is wound into its grooves 23 so that the point of winding remains in the same position. When the inner drum is filled with cable and reaches its nested position the boss 22 engages the cam fork 21 and releases the outer drum which is then forced to rotate with the inner drum. As it does so the cable is wound on it and both drums together are fed axially back in the opposite direction, namely towards the driving end, so that the winding point still remains in the same position. The sequence of operations when unwinding is the reverse of that when winding. Tension on the cable holds the fork 21 on the outer drum in contact with the boss 22 on the inner drum, until when the outer drum has no more cable and reaches the end of its axial travel, the inner drum is rotated by the cable and the spring urges the locking arm 18 back into the notch in the abutment 19. Unwinding continues from the inner drum.

Of course there may be a similar locking arrangement for preventing relative rotation between the two drums during unwinding in case there is no tension in the cable and the outer drum moves until the fork 21 ceases to be in contact with the boss 22 and the locking arm 18 re-enters the notch.

In a modified arrangement shown in Fig. 4 the sleeve 10 attached to the outer drum is omitted and the fixed shaft 3 and driving shaft 5 are replaced by a single solid rotating splined driving shaft. The non-driving end of the inner drum 32 has an outwardly directed flange 33 with a short male screwthread engaging a female screwthread extending almost the whole length of the inner surface of the outer drum 34. The outer drum 34 has at its driving end a similar flange 35 with a male screwthread engaging a female thread formed in a stationary outer casing. This construction lends itself to an arrangement having more than two drums, in which case the outer casing is replaced by a surrounding drum 36, which in turn has a flange 37 cooperating with a thread in another drum or an outer casing 38.

For convenience of description one end of the winch has been referred to as the driving end but it will be appreciated that in general, and in particular in the modified arrangement just described, it is immaterial to which end the drive is connected.

If necessary a shock-absorbing device may be incorporated in the cam fork 21 or other device for interconnecting the drums to lessen the shock that may occur when one drum takes up the drive from another.

The invention provides an arrangement in which the point of winding remains in the same position throughout, thereby rendering it unnecessary to provide expensive and complicated apparatus for moving the guide offering the cable to the drum. At the same time the arrangement enables a considerable length of cable to be wound in a given space, so that in some cases the equipment may be mounted in spaces such as the nose and tail of an aircraft, when it would otherwise have to occupy more useful space in the widest part of the fuselage.

The invention has been described as applied to the winding of cable but it will be appreciated that this term is intended not only to cover cables or ropes of various materials, including steel wire, nylon, manilla, hemp, cotton and the like, but also analogous things such as chains or hoses capable of being wound on a drum.

What I claim as my invention and desire to secure by Letters Patent is:

1. A winch including an outer drum helically-grooved on its outer cylindrical surface, a co-axial inner drum helically-grooved with the opposite hand on its outer cylindrical surface and capable of axial movement between an extended position in which it extends out of the outer drum and a nested position in which it lies within the outer drum, means for rotating the inner drum and simultaneously feeding it axially from the extended position to the nested position to wind cable on to it through an opening in the end of the outer drum and for rotating both drums together when the inner drum is in the nested position and simultaneously feeding them axially in the opposite direction to wind further cable on the outer drum.

2. A winch as claimed in claim 1 in which the rotating means includes co-operating screwthreads co-axial with the drums carried respectively on the two drums.

3. A winch as claimed in claim 1 in which the rotating means includes co-operating screwthreads co-axial with the drums carried respectively on the outer drum and a fixed part of the winch.

4. A winch as claimed in claim 3 including means for preventing relative rotation between the two drums when the inner drum is in the nested position.

5. A winch as claimed in claim 4 including a lock carried by a fixed part of the winch and arranged to hold the outer drum stationary as long as the inner drum is not in the nested position and means carried by the inner drum and arranged to release the lock when the inner drum reaches the nested position.

6. A winch as claimed in claim 5 including a bearing surface formed on the outer drum at the end near the opening and a co-operating bearing surface formed on the inner drum and arranged to engage the said surface on the outer drum when the drums are in the nested position so that the inner drum supports that end of the outer drum.

7. A winch as claimed in claim 6 including a third drum co-axial with and surrounding the outer drum, helically-grooved on its outer cylindrical surface with the same hand as the inner drum and apertured to allow cable to be wound on the outer drum, and means for rotating all three drums together and simultaneously feeding them axially in the direction in which the inner drum moves when moving from its extended position to its nested position, to wind further cable on the third drum.

8. A winch including an outer drum helically-grooved on its outer cylindrical surface, a co-axial inner drum helically-grooved with the opposite hand on its outer cylindrical surface and capable of axial movement between an extended position in which it extends out of the outer drum and a nested position in which it lies within the outer drum, co-operating screwthreads co-axial with the drums carried respectively on the two drums, means for preventing relative rotation between the two drums when the inner drum is in the nested position, and co-operating screwthreads co-axial with the drums carried respectively on the outer drum and a fixed part of the winch.

9. A winch as claimed in claim 8 including a lock carried by a fixed part of the winch and arranged to hold the outer drum stationary as long as the inner drum is not in the nested position and means carried by the inner drum and arranged to release the lock when the inner drum reaches the nested position.

10. A winch as claimed in claim 9 including a bearing surface formed on the outer drum at the end near the opening and a co-operating bearing surface formed on the inner drum and arranged to engage the said surface on the outer drum when the drums are in the nested position so that the inner drum supports that end of the outer drum.

11. A winch as claimed in claim 10 including a third drum co-axial with and surrounding the outer drum, helically-grooved on its outer cylindrical surface with the same hand as the inner drum and apertured to allow cable to be wound on the outer drum, and means for rotating all three drums together and simultaneously feeding them axially in the direction in which the inner drum moves when moving from its extended position to its nested position, to wind further cable on the third drum.

12. A winch as claimed in claim 1 including a third drum co-axial with and surrounding the outer drum, helically-grooved on its outer cylindrical surface with the same hand as the inner drum and apertured to allow cable to be wound on the outer drum, and means for rotating all three drums together and simultaneously feeding them axially in the direction in which the inner drum moves when moving from its extended position to its nested position, to wind further cable on the third drum.

References Cited in the file of this patent

UNITED STATES PATENTS

| | | |
|---|---|---|
| 652,893 | Herdman | July 3, 1900 |
| 1,527,478 | Harper | Feb. 24, 1925 |